United States Patent
Lin et al.

(10) Patent No.: US 11,549,188 B2
(45) Date of Patent: Jan. 10, 2023

(54) MEMBRANE ELECTRODE ASSEMBLY AND METHOD FOR HYDROGEN EVOLUTION BY ELECTROLYSIS

(71) Applicant: INDUSTRIAL TECHNOLOGY RESEARCH INSTITUTE, Hsinchu (TW)

(72) Inventors: Kuo-Hsin Lin, Hsinchu (TW); Hsiao-Chun Huang, Taoyuan (TW); Li-Duan Tsai, Hsinchu (TW); Hao-Ming Chen, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 112 days.

(21) Appl. No.: 17/243,303

(22) Filed: Apr. 28, 2021

(65) Prior Publication Data
US 2022/0349072 A1 Nov. 3, 2022

(51) Int. Cl.
*C25B 11/052* (2021.01)
*C25B 1/04* (2021.01)
*C25B 11/031* (2021.01)
*C25B 9/19* (2021.01)

(52) U.S. Cl.
CPC .............. *C25B 11/052* (2021.01); *C25B 1/04* (2013.01); *C25B 9/19* (2021.01); *C25B 11/031* (2021.01)

(58) Field of Classification Search
CPC ................. C25B 9/19; C25B 9/23; C25B 9/73
See application file for complete search history.

(56) References Cited

U.S. PATENT DOCUMENTS

| | | |
|---|---|---|
| 10,461,350 B2 | 10/2019 | Jang et al. |
| 10,519,555 B2 | 12/2019 | Zhao et al. |
| 10,604,854 B2 | 3/2020 | Dai et al. |
| 10,637,071 B2 | 4/2020 | Huang et al. |

(Continued)

FOREIGN PATENT DOCUMENTS

| | | |
|---|---|---|
| CN | 101112969 A | 1/2008 |
| CN | 101159333 A | 4/2008 |

(Continued)

OTHER PUBLICATIONS

Extended European Search Report for European Application No. 21193172.0, dated Feb. 22, 2022.

(Continued)

*Primary Examiner* — Brian W Cohen
(74) *Attorney, Agent, or Firm* — Birch, Stewart, Kolasch & Birch, LLP

(57) ABSTRACT

A membrane electrode assembly includes a first electrode, a second electrode, and an anion exchange membrane disposed between the first electrode and the second electrode. The first electrode includes a first metal mesh, a first catalyst layer wrapping the first metal mesh, a second metal mesh, and a second catalyst layer wrapping the second metal mesh. The first metal mesh is disposed between the anion exchange membrane and the second metal mesh. The second metal mesh is thicker than the first metal mesh, and the first catalyst layer is thicker than the second catalyst layer. The second catalyst layer is iron, cobalt, manganese, zinc, niobium, molybdenum, ruthenium, platinum, gold, or aluminum. The second catalyst layer is crystalline.

13 Claims, 11 Drawing Sheets

(56) References Cited

U.S. PATENT DOCUMENTS

| | | | |
|---|---|---|---|
| 10,914,011 B2* | 2/2021 | Lin | C25B 1/02 |
| 10,914,012 B2* | 2/2021 | Lin | C25B 9/23 |
| 2009/0119989 A1 | 5/2009 | Withers-Kirby et al. | |
| 2016/0017507 A1 | 1/2016 | Dai et al. | |
| 2016/0049677 A1* | 2/2016 | Muller | C25B 1/04 |
| | | | 429/480 |
| 2016/0215402 A1* | 7/2016 | Takahashi | C02F 1/461 |
| 2018/0345266 A1 | 12/2018 | Zhao | |
| 2019/0071784 A1* | 3/2019 | Yoshinaga | C25B 11/031 |
| 2020/0017039 A1 | 1/2020 | Li et al. | |
| 2020/0173040 A1 | 6/2020 | Lin et al. | |
| 2020/0173042 A1 | 6/2020 | Lin et al. | |
| 2020/0173043 A1 | 6/2020 | Lin et al. | |
| 2021/0095383 A1 | 4/2021 | Lin et al. | |

FOREIGN PATENT DOCUMENTS

| | | | | |
|---|---|---|---|---|
| CN | 104419945 A | 3/2015 | | |
| CN | 106191916 A | 12/2016 | | |
| CN | 106605011 A | 4/2017 | | |
| CN | 106660013 A | 5/2017 | | |
| CN | 108291320 A | 7/2018 | | |
| CN | 109225256 A | 1/2019 | | |
| CN | 109317163 A | 2/2019 | | |
| CN | 111686743 A | 9/2020 | | |
| DE | 102018105115 A1 * | 9/2019 | | C25B 11/073 |
| JP | 2017-525094 A | 8/2017 | | |
| JP | 2020-73735 A | 5/2020 | | |
| TW | I405717 B1 | 8/2013 | | |
| TW | 202022161 A | 6/2020 | | |
| WO | WO 2018/037774 A1 | 3/2018 | | |

OTHER PUBLICATIONS

Taiwanese Office Action and Search Report for Taiwanese Application No. 110115289, dated Oct. 6, 2021.

Trotochaud et al., "Solution-Cast Metal Oxide Thin Film Electrocatalysts for Oxygen Evolution," Journal of the American Chemical Society, vol. 134, 2012, p. 17253-17261.

Japanese Office Action for Japanese Application No. 2021-172261, dated Jun. 28, 2022, with English translation.

* cited by examiner

MEMBRANE ELECTRODE ASSEMBLY AND METHOD FOR HYDROGEN EVOLUTION BY ELECTROLYSIS

TECHNICAL FIELD

The technical field relates to membrane electrode assembly, and in particular it relates to method for hydrogen evolution by electrolysis with the membrane electrode assembly.

BACKGROUND

Seeking alternative energy is imperative now due to energy shortages, and hydrogen energy is the best choice. Hydrogen gas serving as fuel meets the requirements of environmental protection, and electrolysis of water is the easiest way to generate hydrogen and oxygen. In the future development of green hydrogen source technologies for carbon neutrality, the hydrogen evolution by electrolysis of alkaline water has the advantages of low construction cost and long component durability, thereby being a promising technology and attracting international attention.

The use of clean renewable energy is an international future development trend. The current focus of global development is on improving the efficiency of renewable energy, especially surplus power. Hydrogen evolution by electrolysis of water is beneficial to regulating the excess surplus electricity of renewable electricity. Therefore, improving the cost and efficiency of hydrogen evolution by electrolysis of water is an important basis of the industrialization of future technologies. Efficiently integrating various components to improve electrolysis efficiency and reduce costs is the critical core. Conventional electrolysis needs a flow channel layer to import alkaline aqueous solution and export the hydrogen and oxygen generated by electrolysis. However, the flow channel layer is manufactured by mechanical processing, which is expensive and increases the cost of electrolysis. Accordingly, a novel membrane electrode assembly is called for to omit the flow channel layer.

SUMMARY

One embodiment of the disclosure provides a membrane electrode assembly, including: a first electrode; a second electrode; and an anion exchange membrane disposed between the first electrode and the second electrode. The first electrode includes a first metal mesh; a first catalyst layer wrapping the first metal mesh; a second metal mesh; and a second catalyst layer wrapping the second metal mesh, wherein the first metal mesh is disposed between the anion exchange membrane and the second metal mesh, wherein the second metal mesh is thicker than the first metal mesh, the first catalyst layer is thicker than the second catalyst layer, the second catalyst layer is iron, cobalt, manganese, zinc, niobium, molybdenum, ruthenium, platinum, gold, or aluminum, and the second catalyst layer is crystalline.

One embodiment of the disclosure provides a method for hydrogen evolution by electrolysis, including: dipping a membrane electrode assembly in an alkaline aqueous solution, wherein the membrane electrode assembly includes: a first electrode; a second electrode; and an anion exchange membrane disposed between the first electrode and the second electrode. The first electrode includes a first metal mesh; a first catalyst layer wrapping the first metal mesh; a second metal mesh; and a second catalyst layer wrapping the second metal mesh, wherein the first metal mesh is disposed between the anion exchange membrane and the second metal mesh, wherein the second metal mesh is thicker than the first metal mesh, the first catalyst layer is thicker than the second catalyst layer, the second catalyst layer is iron, cobalt, manganese, zinc, niobium, molybdenum, ruthenium, platinum, gold, or aluminum, and the second catalyst layer is crystalline. The method also includes applying a potential to the first electrode and the second electrode to electrolyze the alkaline aqueous solution for generating hydrogen with either the first electrode or the second electrode, and generating oxygen with the other electrode, either the first electrode or the second electrode.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
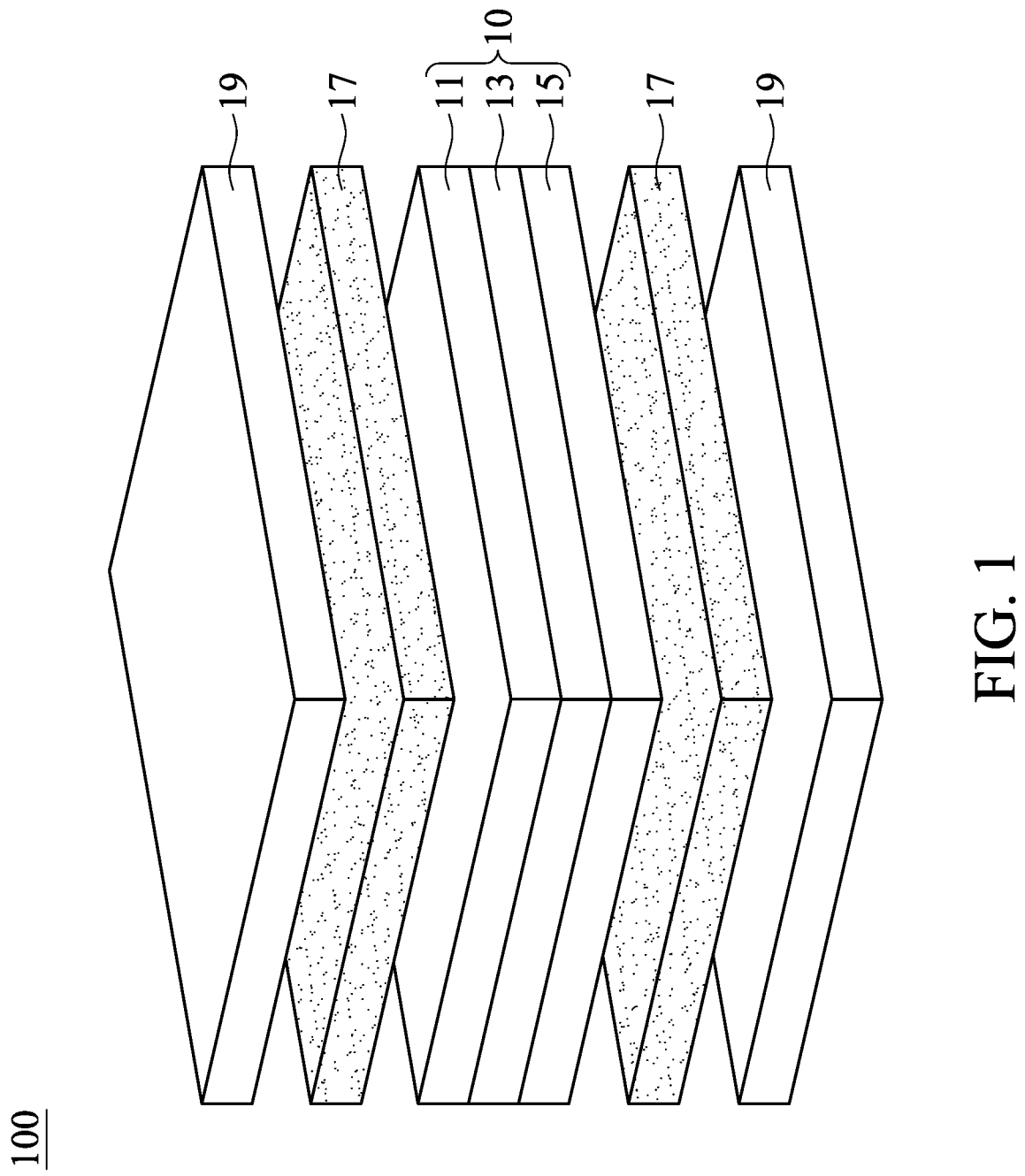
FIG. 1 shows an electrolysis device for hydrogen evolution.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides an electrolysis device 100 for hydrogen evolution, as shown in FIG. 1. An anion exchange membrane 13 is disposed between an anode 11 and a cathode 15 to form a membrane electrode assembly (MEA) 10, and MEA 10 is disposed between two current collectors 19. For importing reactants (such as an alkaline aqueous solution) to MEA 10 and exporting products (such as hydrogen and oxygen) from MEA 10, one flow channel layer 17 should be disposed between the current collector 19 and the anode 11, and another one flow channel layer 17 should be disposed between the current collector 19 and the cathode 15. In general, the manufacture cost of the flow channel layer 17 is high, thereby increasing the cost of electrolysis device 100 for hydrogen evolution.

Figure 2:
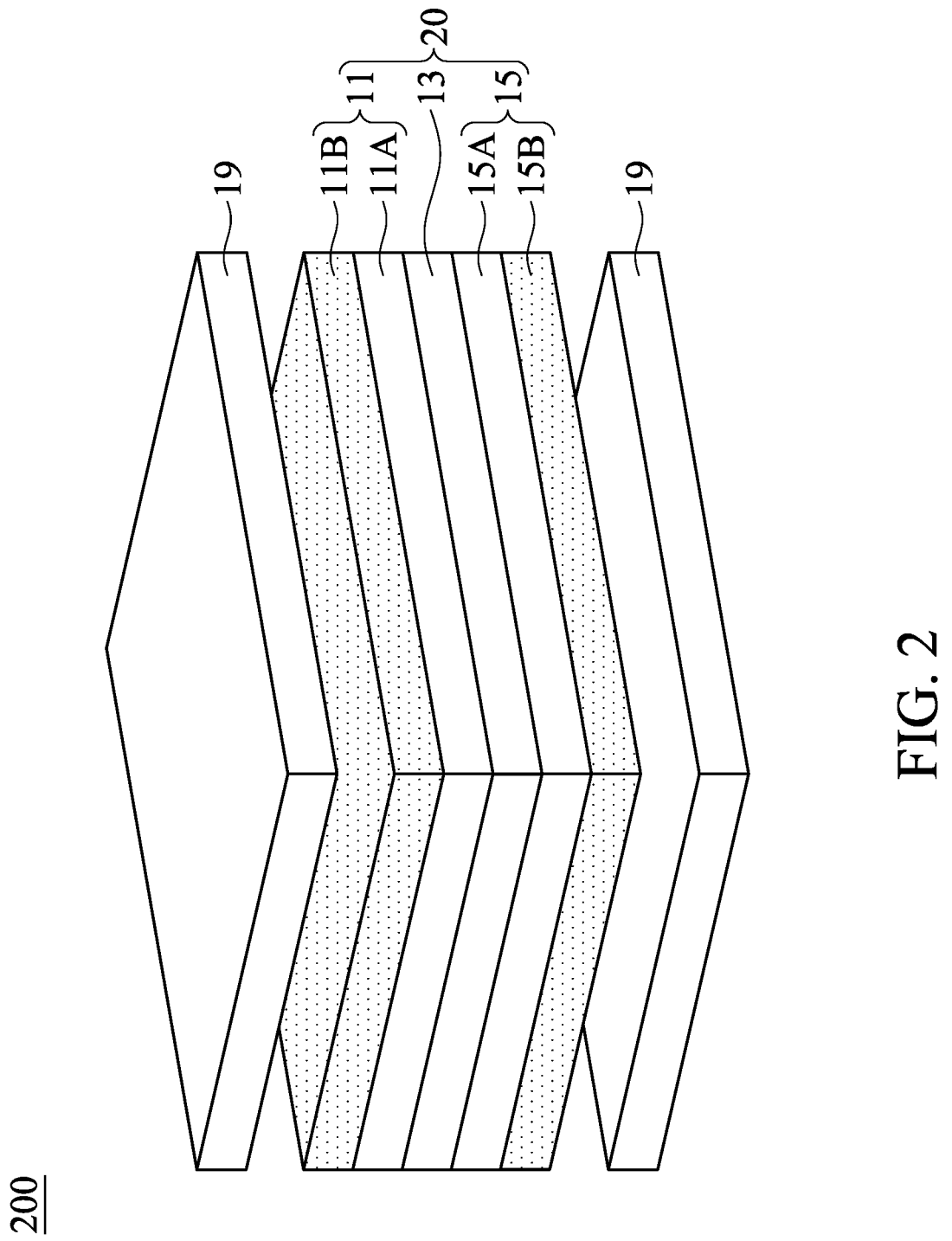
FIG. 2 shows an electrolysis device for hydrogen evolution.

For addressing the flow channel layer issue, one embodiment of the disclosure provides an electrolysis device 200 for hydrogen evolution, as shown in FIG. 2. The electrolysis device 200 for hydrogen evolution includes MEA 20 disposed between two current collectors 19. MEA 20 includes an anode 11, a cathode 15, and an anionic exchange membrane 13 disposed between the anode 11 and the cathode 15. The anode 11 includes a metal mesh 11A wrapped by a catalyst layer C1 (not shown) and a metal mesh 11B wrapped by a catalyst layer C2 (not shown). The metal mesh 11A is disposed between the anion exchange membrane 13 and the metal mesh 11B. For example, the metal mesh 11A can be stainless steel mesh, Ti mesh, Ni mesh, Ni alloy mesh, niobium alloy mesh, copper mesh, or aluminum mesh. The catalyst layer C1 has a chemical structure of $M'_aM''_bN_2$, $M'_cM''_dC_e$, or $M_xRu_yN_2$, wherein M' is Ni, Co, Fe, Mn, Cr, V, Ti, Cu, or Zn, M'' is Nb, Ta, or a combination thereof, M is Ni, Co, Fe, Mn, Cr, V, Ti, Cu, or Zn, $0.7 \le a \le 1.7$, $0.3 \le b \le 1.3$, $a+b=2$, $0.24 \le c \le 1.7$, $0.3 \le d \le 1.76$, $0.38 \le e \le 3.61$, $0 < x < 1.3$, $0.7 < y < 2$, $x+y=2$, wherein $M'_aM''_bN_2$ is a cubic crystal system, $M'_cM''_dC_e$ is a cubic crystal system or amorphous, and $M_xRu_yN_2$ is a cubic crystal system or amorphous. The metal mesh 11A wrapped by the catalyst layer C1 can be referred to Taiwan Patent No. 1677596 that was previously applied by the applicant. Note that the catalyst C1 is not limited to the above catalyst composition, and can be any suitable commercially available catalyst for the anode.

On the other hand, the metal mesh 11B can be stainless steel mesh, Ti mesh, Ni mesh, Ni alloy mesh, niobium alloy mesh, copper mesh, or aluminum mesh. The catalyst layer C2 is iron, cobalt, manganese, zinc, niobium, molybdenum, ruthenium, platinum, gold, or aluminum. In one embodiment, the catalyst C2 wrapping the meal mesh 11B is iron, cobalt, zinc, niobium, molybdenum, ruthenium, platinum, or gold. Because the metal mesh 11B wrapped by the catalyst layer C2 is formed by chemical reduction, such that the catalyst layer C2 is crystalline. As known from experiments, the crystalline catalyst layer C2 has a better effect of hydrogen evolution by electrolysis than that of the amorphous catalyst C2. In addition, the metal mesh 11B is thicker than the metal mesh 11A so as to replace the function of the flow channel layer. In one embodiment, the metal mesh 11A is a stainless steel mesh with a smooth surface, and the metal mesh 11B is a nickel mesh with a rough surface (e.g. nickel foam). The metal mesh 11A may protect the anion exchange membrane 13 from being pierced by the metal mesh 11B (the pierced anion exchange membrane 13 may result in short failure of the device). The metal mesh 11B may replace the expensive flow channel layer, and provide a better effect of hydrogen evolution by electrolysis than that of the flow channel layer. On the other hand, the catalyst layer C1 is thicker than the catalyst layer C2. The catalyst layer C1 may have a thickness of 0.25 micrometers to 1 micrometers, and the catalyst layer C2 may have a thickness of 0.01 micrometers to 0.25 micrometers. If the catalyst layer C1 has a thickness of less than or equal to that of the catalyst layer C2, the effect of hydrogen evolution by electrolysis will be poor.

As shown in FIG. 2, the cathode 15 includes a metal mesh 15A wrapped by a catalyst layer C3 (not shown) and a metal mesh 15B wrapped by a catalyst layer C4 (not shown). The metal mesh 15A is disposed between the anion exchange membrane 13 and the metal mesh 15B. For example, the metal mesh 15A can be stainless steel mesh, Ti mesh, Ni mesh, Ni alloy mesh, niobium alloy mesh, copper mesh, or aluminum mesh. The catalyst layer C3 has a chemical structure of $M_xRu_yN_2$ or $M_xRu_y$, M is Ni, Co, Fe, Mn, Cr, V, Ti, Cu, or Zn, $0 < x < 1.3$, $0.7 < y < 2$, $x+y=2$, $M_xRu_yN_2$ is a cubic crystal system or amorphous, and $M_xRu_y$ is a cubic crystal system. The metal mesh 15A wrapped by the catalyst layer C3 can be referred to Taiwan Patent No. 1677596 that was previously applied by the applicant. Note that the catalyst C3 is not limited to the above catalyst composition, and can be any suitable commercially available catalyst for the cathode.

On the other hand, the metal mesh 15B can be stainless steel mesh, Ti mesh, Ni mesh, Ni alloy mesh, niobium alloy mesh, copper mesh, or aluminum mesh. The catalyst layer C4 is iron, cobalt, manganese, zinc, niobium, molybdenum, ruthenium, platinum, gold, or aluminum. In one embodiment, the catalyst C4 wrapping the metal mesh 15B is iron, cobalt, manganese, zinc, niobium, molybdenum, gold, or aluminum. Because the metal mesh 15B wrapped by the catalyst layer C4 is formed by chemical reduction, such that the catalyst layer C4 is crystalline. As known from experiments, the crystalline catalyst layer C4 has a better effect of hydrogen evolution by electrolysis than that of the amorphous catalyst C4. In addition, the metal mesh 15B is thicker than the metal mesh 15A so as to replace the function of the flow channel layer. In one embodiment, the metal mesh 15A is a stainless steel mesh with a smooth surface, and the metal mesh 15B is a nickel mesh with a rough surface (e.g. nickel foam). The metal mesh 15A may protect the anion exchange membrane 13 from being pierced by the metal mesh 15B (the pierced anion exchange membrane 13 may result in short failure of the device). The metal mesh 15B may replace the expensive flow channel layer, and provide a better effect of hydrogen evolution by electrolysis than that of the flow channel layer. On the other hand, the catalyst layer C3 is thicker than the catalyst layer C4. The catalyst layer C3 may have a thickness of 10 micrometers to 100 micrometers, and the catalyst layer C4 may have a thickness of 0.01 micrometers to 0.25 micrometers. If the catalyst layer C3 has a thickness of less than or equal to that of the catalyst layer C4, the effect of hydrogen evolution by electrolysis will be poor.

In one embodiment, the anion exchange film 13 can be a halogen ion-containing imidazole polymer or other suitable materials. For example, the anion exchange film 13 can be FAS (commercially available from Fumatech) or X37-50 (commercially available from Dioxide materials). Because MEA 20 is used to generate hydrogen by electrolyzing alkaline aqueous solution, the anion exchange film 13 rather than other ionic exchange film is adopted. In some embodiments, the current collectors can be stainless steel plate, titanium plate, or another suitable plate.

Because the metal mesh 11B of the anode 11 and the metal mesh 15B of the cathode 15 may function as the flow channel layer, there is no additional flow channel layer is required between MEA 20 and the current collectors 19. Note that both the anode 11 and the cathode 15 in FIG. 2 adopt the design of the dual-layered metal meshes, but the disclosure is not limited thereto. For example, the anode can be another commercially available anode (non-metal mesh) to collocate with the flow channel layer, and only the cathode utilizes the design of the dual-layered metal meshes to omit the flow channel layer. On the other hand, the cathode can be another commercially available cathode (non-metal mesh) to collocate with the flow channel layer, and only the anode utilizes the design of the dual-layered metal meshes to omit the flow channel layer. In other words, only one side of MEA may utilize the dual-layered metal meshes to omit the flow channel layer, and the other side of MEA may utilize the conventional flow channel layer.

In some embodiments, the catalyst layer C1 has a thickness of 0.25 micrometers to 1 micrometer, and the catalyst layer C3 has a thickness of 10 micrometers to 100 micrometers. If the catalyst layer C1 or the catalyst layer C3 is too thin, the effect of hydrogen evolution by electrolysis will be poor. If the catalyst layer C1 or the catalyst layer C3 is too thick, the effect of hydrogen evolution by electrolysis will be poor. In some embodiments, the catalyst layer C2 (or the catalyst layer C4) has a thickness of 0.01 micrometers to 0.25 micrometers. If the catalyst layer C2 or the catalyst layer C4 is too thin, the effect will be similar to that without the catalyst layer. If the catalyst layer C2 or the catalyst layer C4 is too thick, the effect of hydrogen evolution by electrolysis of MEA will be lowered.

In some embodiments, the metal mesh 11B or the metal mesh 15B has a pore size of 60 micrometers to 120 micrometers. If the pore size of the metal mesh 11B or the metal mesh 15B is too small, the reactants such as the alkaline aqueous solution cannot be efficiently imported to MEA 20 or the gaseous products (such as hydrogen and oxygen) cannot be efficiently exported from MEA 20. If the pore size of the metal mesh 11B or the metal mesh 15B is too large, the efficiency of hydrogen evolution by electrolysis cannot be kept for a long period (e.g. the decay extent after being a long-term operation would be high).

In some embodiments, the metal mesh 11B and the catalyst layer C2 have a weight ratio of 90:10 to 99.9:0.1, or the metal mesh 15B and the catalyst layer C4 have a weight ratio of 90:10 to 99.9:0.1. If the above weight ratio is too low (e.g. the catalyst layer amount is too high), the efficiency of hydrogen evolution by electrolysis will be poor. If the above weight ratio is too high (e.g. the catalyst layer amount is too low), the effect will be similar to that without the catalyst layer.

In some embodiments, the metal mesh 11B wrapped by the catalyst layer C2 is the same as the metal mesh 15B wrapped by the catalyst layer C4. Alternatively, the metal mesh 11B wrapped by the catalyst layer C2 is different from the metal mesh 15B wrapped by the catalyst layer C4, such as different catalyst types, different pore sizes of the metal meshes, different thickness of the metal meshes, or a combination thereof. For example, the catalyst layer C2 wrapping the metal mesh 11B may adopt iron, and the catalyst layer C4 wrapping the metal mesh 15B may adopt cobalt or gold.

One embodiment of the disclosure provides a method for hydrogen evolution by electrolysis, including: dipping MEA 20 in an alkaline aqueous solution. MEA 20 is similar to those described above, and the detail is not repeated here. Subsequently, a potential is applied to the anode 11 and the cathode 15 to electrolyze the alkaline aqueous solution for generating hydrogen using the cathode 15 and generating oxygen using the anode 11. In one embodiment, the alkaline aqueous solution has a pH value that is greater than or equal to 13. If the pH value of the alkaline aqueous solution is too low, its conductivity will be poor. In one embodiment, the alkaline aqueous solution has a pH value of 14.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1 (Nickel Foams Wrapped by Different Metals)

Commercially available nickel foam (GF28024657 commercially available from Merck) was pre-treated by the following steps: (1) dipped in acetone to be ultrasonic vibrated for 15 minutes; (2) washed with de-ionized water for 10 minutes; (3) dipped in 10 wt % of HCl and ultrasonic vibrated and washed for 30 minutes and then washed with water; and (4) dried in a vacuum oven at 50° C. After the pre-treatment, 250 mM of metal precursor solutions of Fe, Co, Mn, Zn, Nb, Mo, Cu, Ru, Pt, Au, Al, and Cr were formulated, respectively. The pre-treated nickel foam was dipped in the metal precursor solution and stirred for 3 hours, and the nickel foam surface was then washed with de-ionized water until the seepage liquid being transparent. The extra water was removed from the nickel foam by wipe paper, and the nickel foam was dried in a hot air circulation oven at 90° C., thereby obtaining a metal-nickel foam sample. As shown in the diffraction pattern of the transmission electron microscope (TEM), the metal of the samples had a crystalline phase. Note that the method of wrapping the nickel foam by the metal belongs to chemical reduction, thereby forming the metal of crystalline phase. If another method such as electroplating was adopted, the metal formed on the nickel foam would not be the crystalline phase. The half-cell electrochemical performance was measured by the following steps. In 0.1 M KOH solution, Ag/AgCl served as a reference electrode to measure EIS and LSV of OER (oxygen evolution reaction) and HER (hydrogen evolution reaction). In EIS measurement, the scan range of OER and HER was 0.1 Hz to 10000 Hz. In LSV measurement of OER, the scan voltage ranged from 1.0 V to 2.0 V, the scan rate was 10 mV/s, and there were three scans. In LSV measurement of HER, the scan voltage ranged from 0 to -0.4 V, the scan rate was 10 mV/s, and there were three scans.

TABLE 1

|  | HER activity (mV at 10 mA/cm$^2$) | OER activity (mV of 100 mA/cm$^2$) |
| --- | --- | --- |
| Nickel foam | 188 | 349 |
| Fe-nickel foam | 160 | 272 |
| Co-nickel foam | 147 | 337 |
| Mn-nickel foam | 162 | 360 |
| Zn-nickel foam | 158 | 305 |
| Nb-nickel foam | 164 | 320 |
| Mo-nickel foam | 168 | 342 |
| Cu-nickel foam | Not detectable | 353 |
| Ru-nickel foam | Not detectable | 324 |
| Pt-nickel foam | Not detectable | 338 |
| Au-nickel foam | 132 | 330 |
| Al-nickel foam | 184 | 351 |
| Cr-nickel foam | 209 | 368 |

For the non-noble metals, the Co-nickel foam had the best HER performance, which had an overpotential of 147 mV at the current density of 10 mA/cm$^2$, as shown in Table 1. For the noble metals, the Au-nickel foam had the best HER performance, which had an overpotential of 132 mV at the current density of 10 mA/cm$^2$. In the OER reactions, the Fe-nickel foam had the lowest overpotential of 272 mV at the current density of 100 mA/cm$^2$.

Example 2 (Nickel Foams Wrapped by Different Amounts of Different Metals)

The concentrations of the metal precursor solutions of Fe, Co, Mn, Zn, Nb, Mo, Cu, Ru, Pt, Au, Al, and Cr were adjusted, respectively. The pre-treated nickel foam was dipped in the metal precursor solution and stirred for 3 hours, and the nickel foam surface was then washed with de-ionized water until the seepage liquid being transparent. The extra water was removed from the nickel foam by wipe paper, and the nickel foam was dried in a hot air circulation oven at 90° C., thereby obtaining a metal-nickel foam sample. The wrapping amounts on the nickel foams, HER activities, and OER activities of the different metals are shown in Tables 2 and 3, and HER activities and OER activities were measured by the method described above.

TABLE 2

| | Metal for HER/ (Nickel foam + Metal) (wt %) | | | | HER activity (mV at 10 mA/cm$^2$) |
|---|---|---|---|---|---|
| | 1st | 2nd | 3rd | average | |
| Fe | 2.34 | 1.53 | 2.14 | 2.00 | 160 |
| Co | 5.26 | 6.07 | 4.76 | 5.36 | 146 |
| Mn | 1.06 | 2.27 | 0.00 | 1.11 | 162 |
| Cu | 77.86 | 84.56 | 79.45 | 80.62 | Not detectable |
| Zn | 5.88 | 9.96 | 2.54 | 6.13 | 158 |
| Nb | 0.12 | 0.32 | 0.05 | 0.17 | 164 |
| Mo | 1.99 | 1.85 | 2.32 | 2.05 | 168 |
| Ru | 77.79 | 60.38 | 72.92 | 70.36 | Not detectable |
| Pt | 59.33 | 70.23 | 89.02 | 72.86 | Not detectable |
| Au | 25.36 | 33.93 | 33.93 | 31.07 | 132 |

TABLE 3

| | Metal for OER/ (Nickel foam + Metal) (at %) | | | | OER activity (mV at 100 mA/cm$^2$) |
|---|---|---|---|---|---|
| | 1st | 2nd | 3rd | average | |
| Fe | 2.45 | 1.61 | 2.25 | 2.10 | 272 |
| Co | 5.23 | 6.04 | 4.74 | 5.34 | 337 |
| Mn | 1.12 | 2.40 | 0.00 | 1.17 | 360 |
| Cu | 76.46 | 83.50 | 78.12 | 79.36 | 353 |
| Zn | 5.30 | 9.06 | 2.29 | 5.55 | 305 |
| Nb | 0.075 | 0.211 | 0.038 | 0.11 | 320 |
| Mo | 1.24 | 1.15 | 1.46 | 1.28 | 342 |
| Ru | 67.05 | 46.96 | 61.00 | 58.34 | 324 |
| Pt | 30.50 | 41.52 | 70.94 | 47.66 | 338 |
| Au | 9.19 | 13.27 | 13.27 | 11.91 | 330 |

The amounts of the metals wrapping the nickel foams were low (e.g. less than or equal to 10 wt % or at %) enough to achieve sufficient HER activity or OER activity, as shown in Tables 2 and 3.

Example 3

The pre-treated nickel foams were dipped in iron precursor solutions of different concentrations, respectively, and stirred for 3 hours. The nickel foam surface was then washed with de-ionized water until the seepage liquid being transparent. The extra water was removed from the nickel foams by wipe paper, and the nickel foams were dried in a hot air circulation oven at 90° C., thereby obtaining iron-nickel foam samples.

Figure 3:
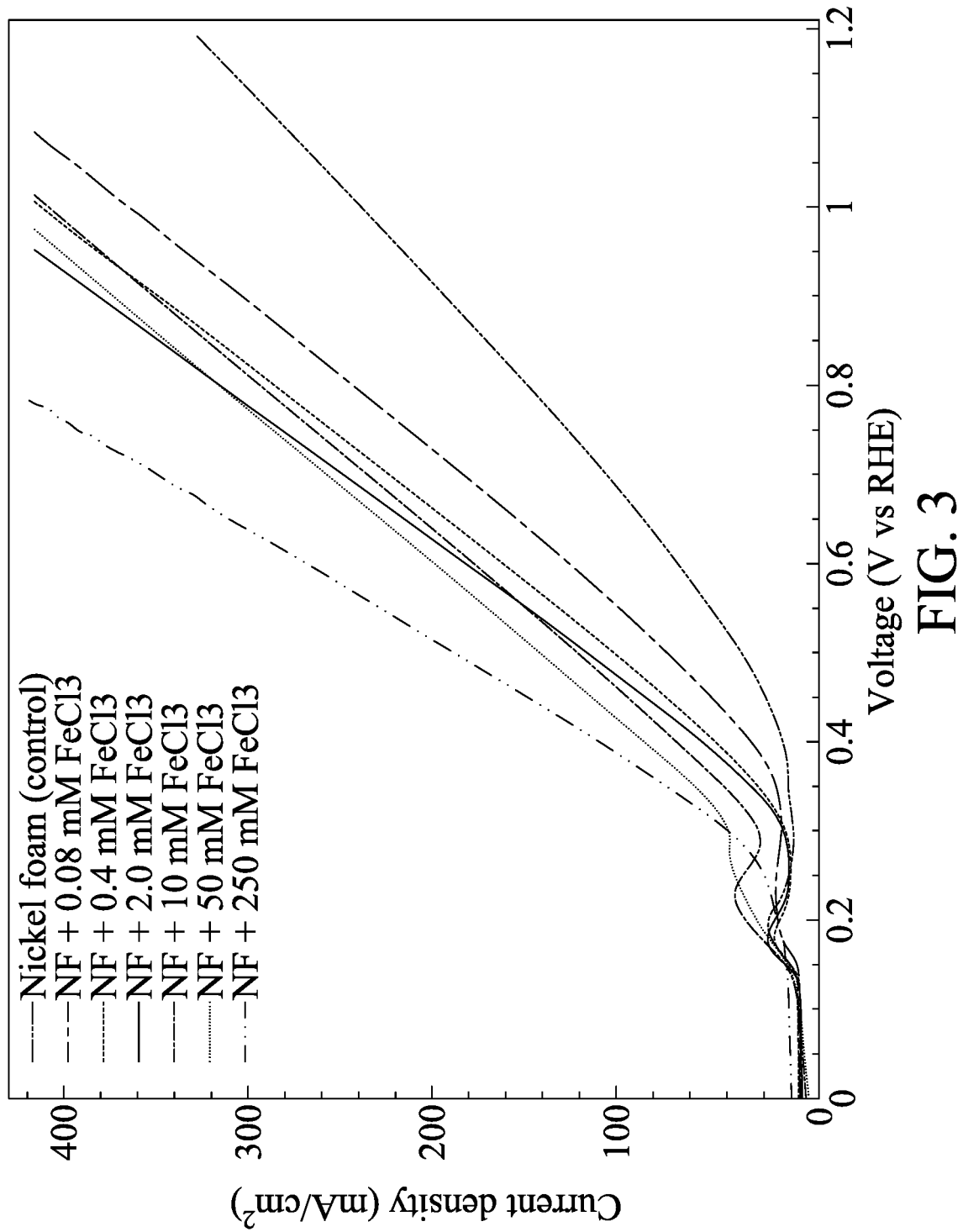
FIG. 3 shows OER curves of Fe-nickel foams formed from iron precursor solutions of different concentrations in one embodiment.

The iron-nickel foam samples formed from the iron precursor solutions of different concentrations were measured by energy dispersive X-ray to perform an elemental analysis. HER activities and OER activities of the different iron-nickel foam samples were measured as tabulated in Table 4, which were measured by the method described above. In addition, the OER curves of the iron-nickel foams formed from the iron precursor solutions of different concentrations are shown in FIG. 3, the horizontal axis in FIG. 3 is the voltage (V) relative to the reversible hydrogen electrode (RHE), and the vertical axis in FIG. 3 is the current density (J, mA/cm$^2$). As shown in Table 4, the nickel foam wrapped by a small amount of iron had effects of improving HER and OER.

TABLE 4

| [FeCl$_3$] | 0.08 mM | 0.4 mM | 2 mM | 10 mM | 50 mM | 250 mM |
|---|---|---|---|---|---|---|
| Fe/Fe + Nickel foam (wt %) | 0.04 | Not detectable | 0.09 | 0.09 | 0.22 | 0.26 |
| HER activity (mV at 10 mA/cm$^2$) | Not available | Not available | Not available | Not available | Not available | 160 |
| OER activity (mV at 100 mA/cm$^2$) | 382 | 326 | 299 | 288 | 281 | 272 |

Example 4

Figure 4:
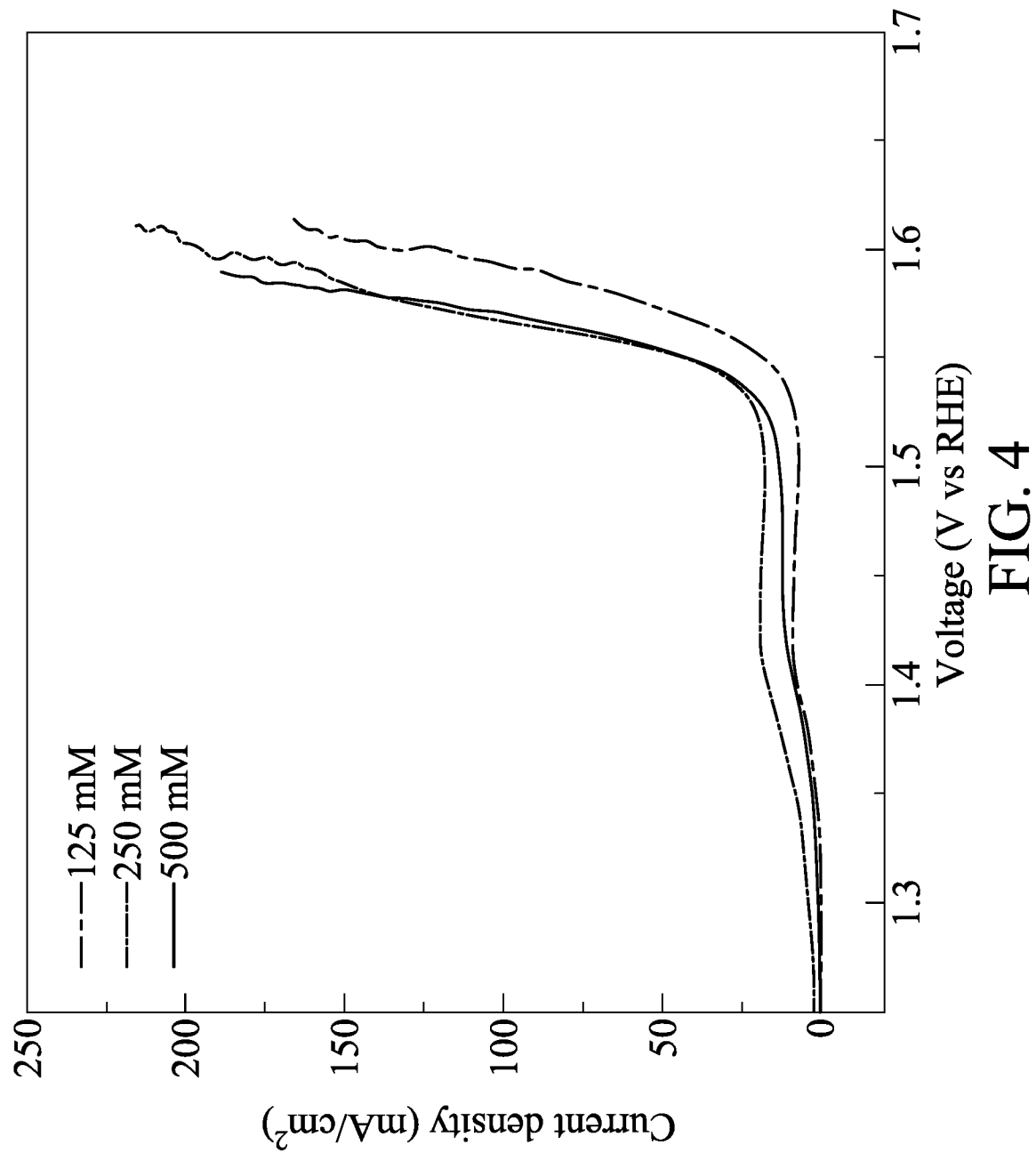
FIG. 4 shows OER curves of Co-nickel foams formed from cobalt precursor solutions of different concentrations in one embodiment.
Figure 5:
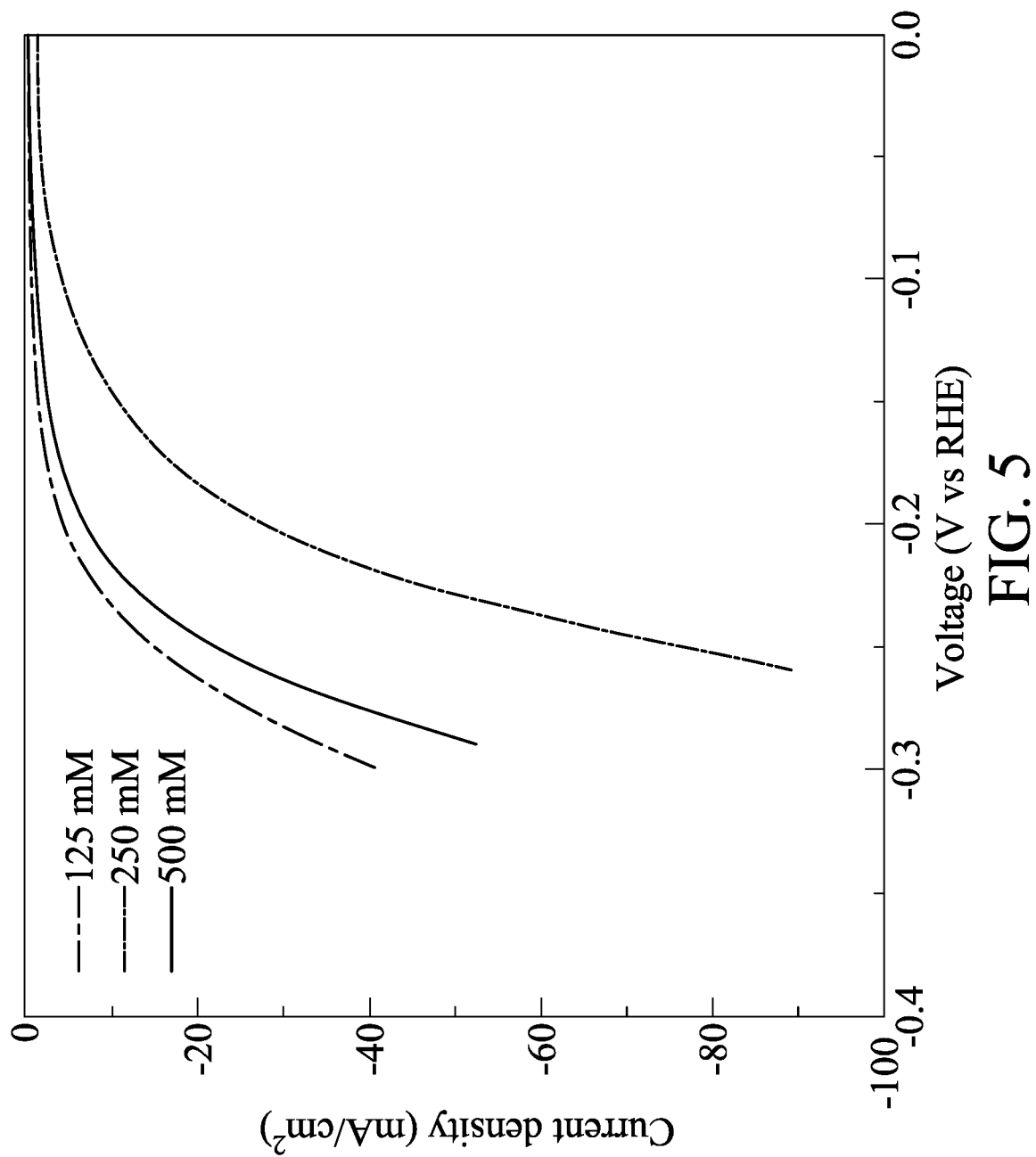
FIG. 5 shows HER curves of Co-nickel foams formed from cobalt precursor solutions of different concentrations in one embodiment.

The pre-treated nickel foams were dipped in cobalt precursor solutions of different concentrations, respectively, and stirred for 3 hours. The nickel foam surface was then washed with de-ionized water until the seepage liquid being transparent. The extra water was removed from the nickel foams by wipe paper, and the nickel foams were dried in a hot air circulation oven at 90° C., thereby obtaining cobalt-nickel foam samples. The cobalt-nickel foam samples formed from the cobalt precursor solutions of different concentrations were measured by energy dispersive X-ray to perform an elemental analysis. HER activities and OER activities of the different cobalt-nickel foam samples were measured as tabulated in Table 5, which were measured by the method described above. In addition, the OER curves of the cobalt-nickel foams formed from the cobalt precursor solutions of different concentrations are shown in FIG. 4, the horizontal axis in FIG. 4 is the voltage (V) relative to the reversible hydrogen electrode (RHE), and the vertical axis in FIG. 4 is the current density (J, mA/cm$^2$). The HER curves of the cobalt-nickel foams formed from the cobalt precursor solutions of different concentrations are shown in FIG. 5, the horizontal axis in FIG. 5 is the voltage (V) relative to the reversible hydrogen electrode (RHE), and the vertical axis in FIG. 5 is the current density (J, mA/cm$^2$). As shown in Table 5, the nickel foam wrapped by a small amount of cobalt had effects of improving HER and OER.

TABLE 5

| [CoCl$_2$] | HER | | | OER | | |
|---|---|---|---|---|---|---|
| | 125 mM | 250 mM | 500 mM | 125 mM | 250 mM | 500 mM |
| Co/Co + nickel foam (wt %) | 1.74 | 5.26 | 4.94 | 1.74 | 5.23 | 4.94 |
| Co/Co + nickel foam (wt %) | 0.76 | 6.07 | 4.13 | 0.75 | 6.04 | 4.09 |
| Co/Co + nickel foam (wt %) | 0.74 | 4.76 | 3.47 | 0.73 | 4.74 | 3.45 |
| Average of Co/Co + nickel foam (wt %) | 1.08 | 5.36 | 4.18 | 1.07 | 5.34 | 4.16 |
| Overpotential at 10 mA/cm$^2$ (mV) | 233 | 147 | 216 | 305 | 131 | 181 |
| Overpotential at 100 mA/cm$^2$ (mV) | Not available | Not available | Not available | 363 | 337 | 340 |

Example 5

Commercially available PtC was coated on a carbon paper and a nickel foam (pores size was 91 micrometers) to serve as a cathode of HER. Commercially available insoluble anode (IrO$_2$/RuO$_2$—Ti mesh, DSA electrode) and a nickel foam (pores size was 91 micrometers) served as the anode of OER, and an anion exchange film X37-50 (commercially available from Dioxide Materials) was interposed between the PtC of the cathode and the DSA electrode of the anode to obtain a membrane electrode assembly (MEA). MEA was interposed between two stainless current collectors, and then dipped in 2 M KOH solution to test its electrochemical activity. The scan voltage ranged from 1.2 V to 2.2 V and the scan rate was 50 mV/s. The membrane electrode assembly could generate a current of 5.18 A at 2 V. The potential of MEA was controlled at 2 V and continuously operated for 1000 minutes, and the current decay of MEA was about 4.6%.

The above experiment was repeated but the pore size of the nickel foam was changed to 151 micrometers. The other components of MEA and the method of testing the electrochemical activity were similar to those described above. The membrane electrode assembly could generate a current of 5.42 A at 2 V. The potential of MEA was controlled at 2 V and continuously operated for 1000 minutes, and the current decay of MEA was about 26.2%.

The above experiment was repeated but the pore size of the nickel foam was changed to 219 micrometers. The other components of MEA and the method of testing the electrochemical activity were similar to those described above. The membrane electrode assembly could generate a current of 5.63 A at 2 V. The potential of MEA was controlled at 2 V and continuously operated for 1000 minutes, and the current decay of MEA was about 22.4%. As known from the experiments, if the pore size of the nickel foam was too large, the decay extent of MEA after being a long-term operation would be high.

Example 6-1

Figure 6:
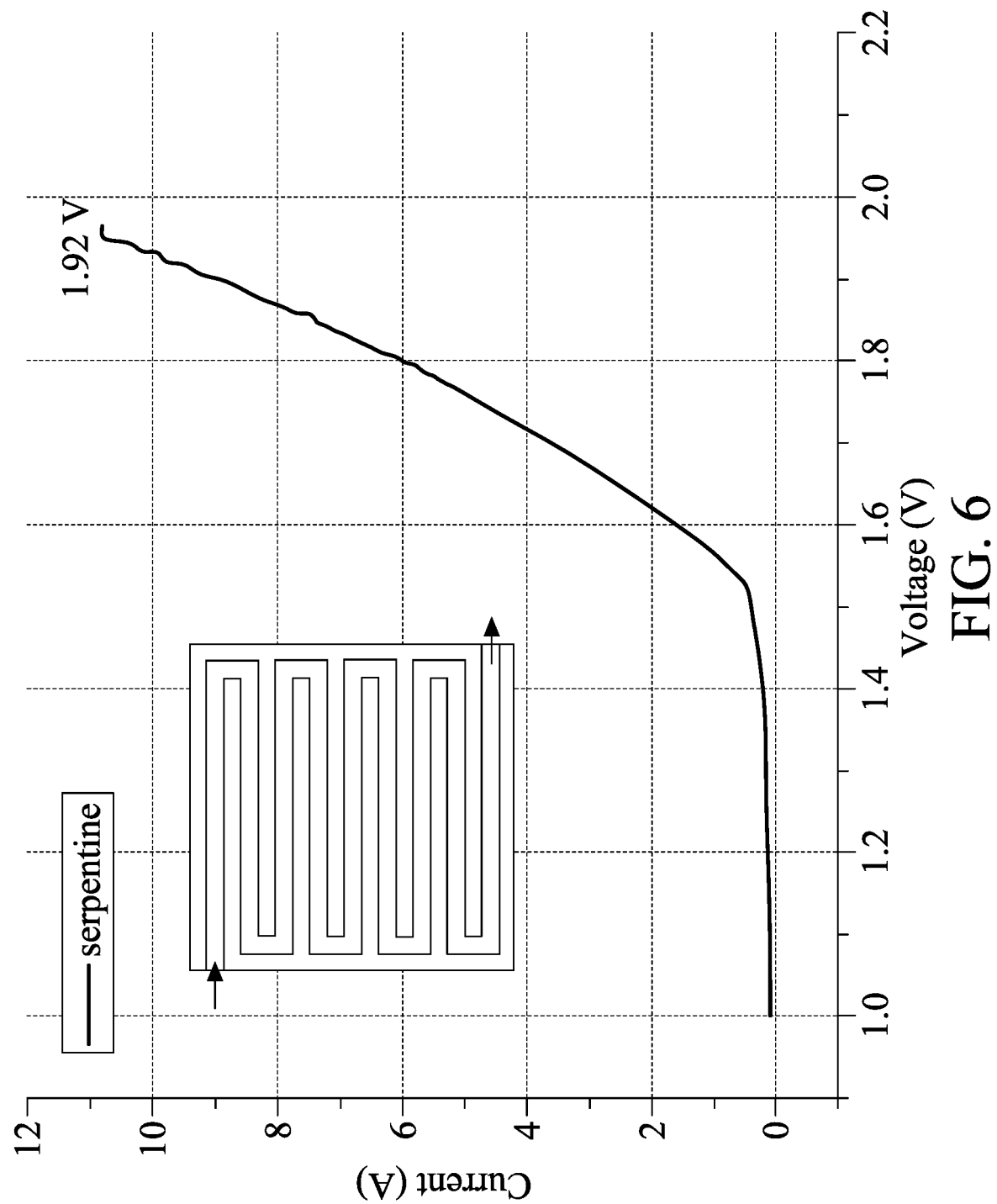
FIG. 6 shows a current versus voltage curve of membrane electrode assemblies in one embodiment.

Ni$_{0.065}$Ru$_{1.935}$ catalyst was prepared on the conductive carbon paper as Preparation Examples 2 and 12 in Taiwan Patent No. 1677596 to serve as a cathode of HER, Ni$_{1.5}$Nb$_{0.5}$N$_2$-stainless steel mesh of Preparation Example 9 in Taiwan Patent No. 1677596 was selected to serve as an anode of OER, and a commercially available anionic exchange membrane X37-50 (Dioxide Materials) was interposed between the cathode and the anode to form MEA. MEA was interposed between two stainless steel current collectors, a serpentine flow channel layer was interposed between the Ni$_{0.065}$Ru$_{1.935}$-conductive carbon paper and one current collector, and another serpentine flow channel layer was interposed between the Ni$_{1.5}$Nb$_{0.5}$N$_2$-stainless steel mesh and another current collector. MEA was dipped in 2 M KOH solution to test its LSV electrochemical activity as below. The scan voltage ranged from 1.0 V to 2.0 V and the scan rate was 50 mV/s. The current versus voltage curve of MEA is shown in FIG. 6.

Example 6-2

Figure 7:
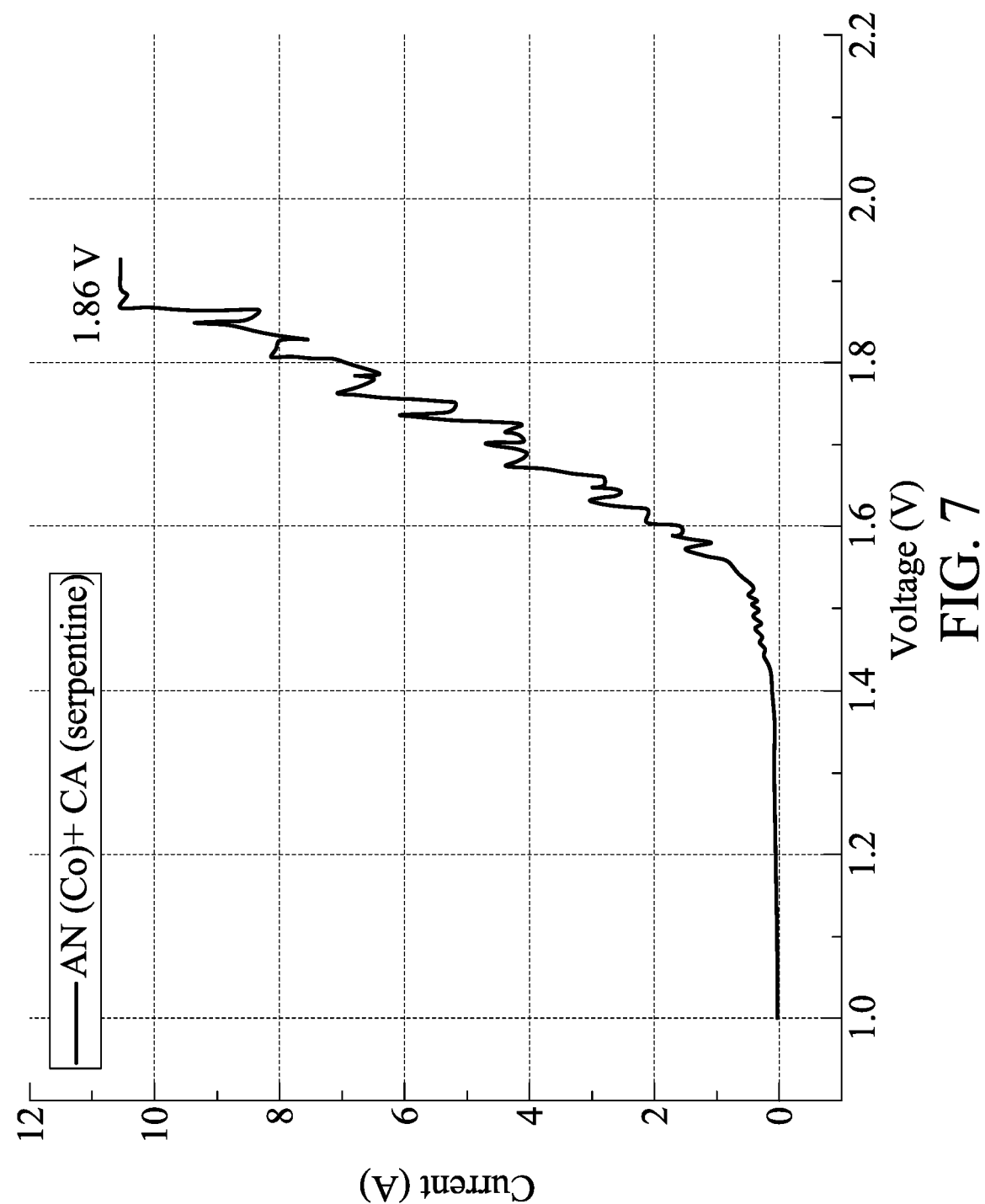
FIG. 7 shows a current versus voltage curve of membrane electrode assemblies in one embodiment.

Example 6-2 was similar to Example 6-1, and the differences in Example 6-2 were Ni$_{1.5}$Nb$_{0.5}$N$_2$-stainless steel mesh and Co-nickel foam (e.g. Example 1) serving as the anode of OER, and the serpentine flow channel layer interposed between the Ni$_{1.5}$Nb$_{0.5}$N$_2$-stainless steel mesh and the current collector was omitted. The other components of MEA and the method of testing the electrochemical activity were similar to those described above. The current versus voltage curve of MEA is shown in FIG. 7.

Example 6-3

Figure 8:
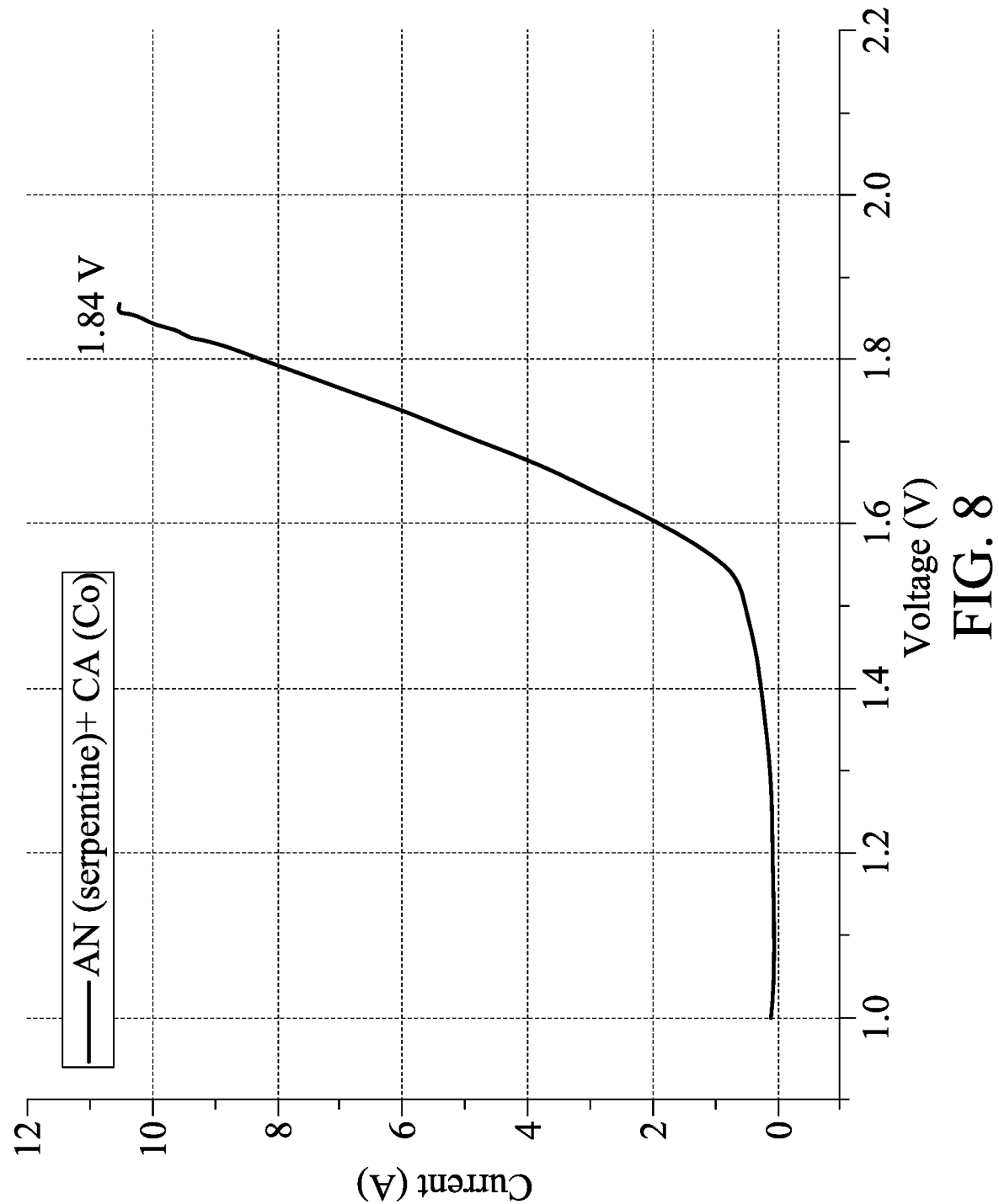
FIG. 8 shows a current versus voltage curve of membrane electrode assemblies in one embodiment.

Example 6-3 was similar to Example 6-1, and the differences in Example 6-3 were Ni$_{0.75}$Ru$_{1.25}$N$_2$-stainless steel mesh and Co-nickel foam (e.g. Example 1) serving as the cathode of HER, and the serpentine flow channel layer interposed between the Ni$_{0.75}$Ru$_{1.25}$N$_2$-stainless steel mesh and the current collector was omitted. The other components of MEA and the method of testing the electrochemical activity were similar to those described above. The current versus voltage curve of MEA is shown in FIG. 8.

Example 6-4

Figure 9:
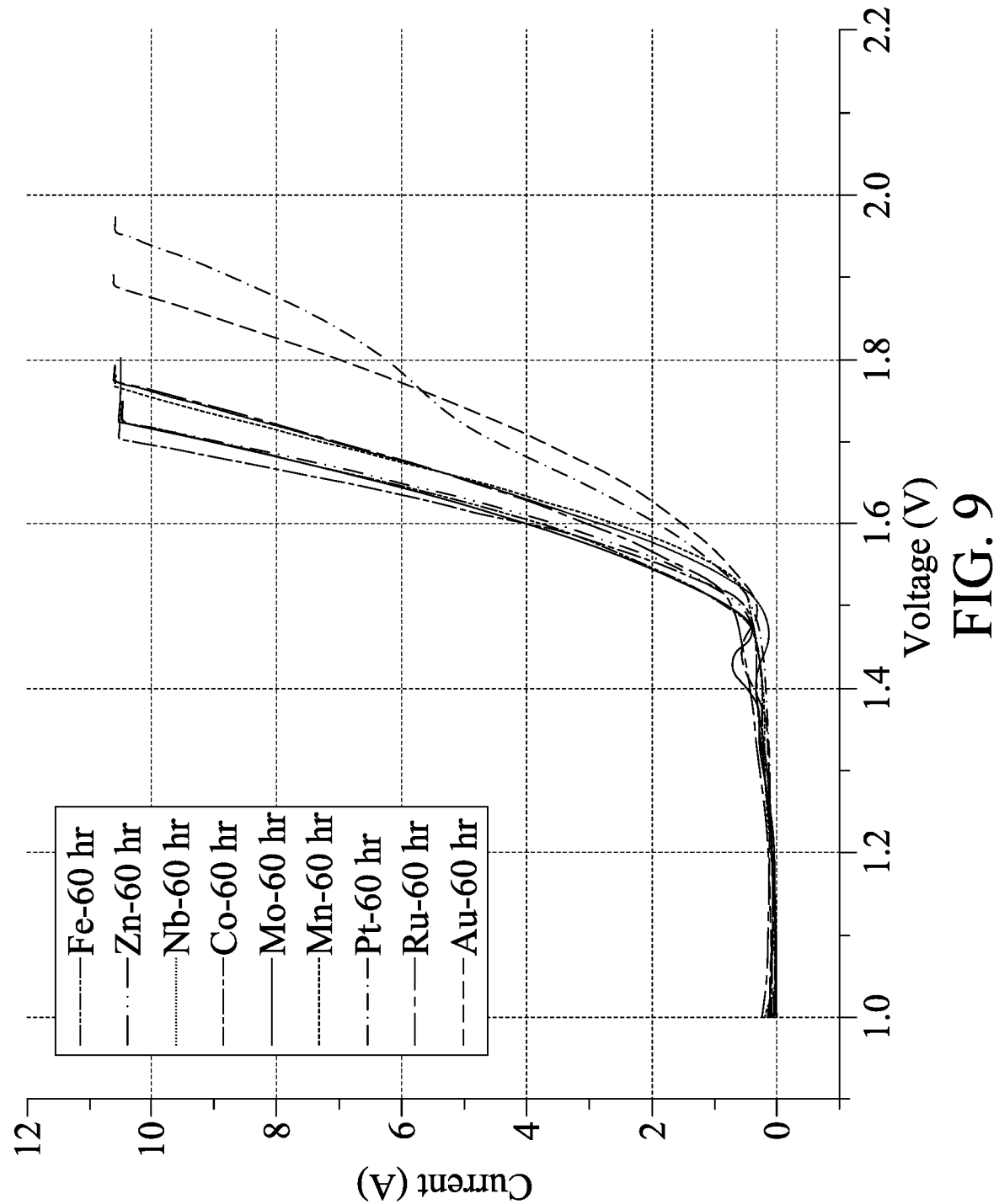
FIG. 9 shows current versus voltage curves of membrane electrode assemblies after being operated for 60 hours in one embodiment.

Example 6-4 was similar to Example 6-1, and the differences in Example 6-4 were Ni$_{0.065}$Ru$_{1.935}$-conductive carbon paper and different metal-nickel foams (e.g. Example 1) serving as the anodes of HER, Ni$_{1.5}$Nb$_{0.5}$N$_2$-stainless steel mesh and different metal-nickel foams (e.g. Example 1) serving as the anodes of OER, the serpentine flow channel layer interposed between the Ni$_{0.065}$Ru$_{1.935}$-conductive carbon paper and the current collector was omitted, and the serpentine flow channel layer interposed between the Ni$_{1.5}$Nb$_{0.5}$N$_2$-stainless steel mesh and the current collector was omitted. The other components of MEA and the method of testing the electrochemical activity were similar to those described above. The current versus voltage curves of MEAs after being operated for 60 hours are shown in FIG. 9.

Although the metal-nickel foams in the anode and the cathode were the same in this Example, it should be understood that the metal-nickel foams in the anode and the cathode could be different (e.g. different pore sizes of the nickel foam, different amounts of the metal for wrapping the nickel foam, different types of the metal, or a combination thereof).

Example 7

Figure 10:
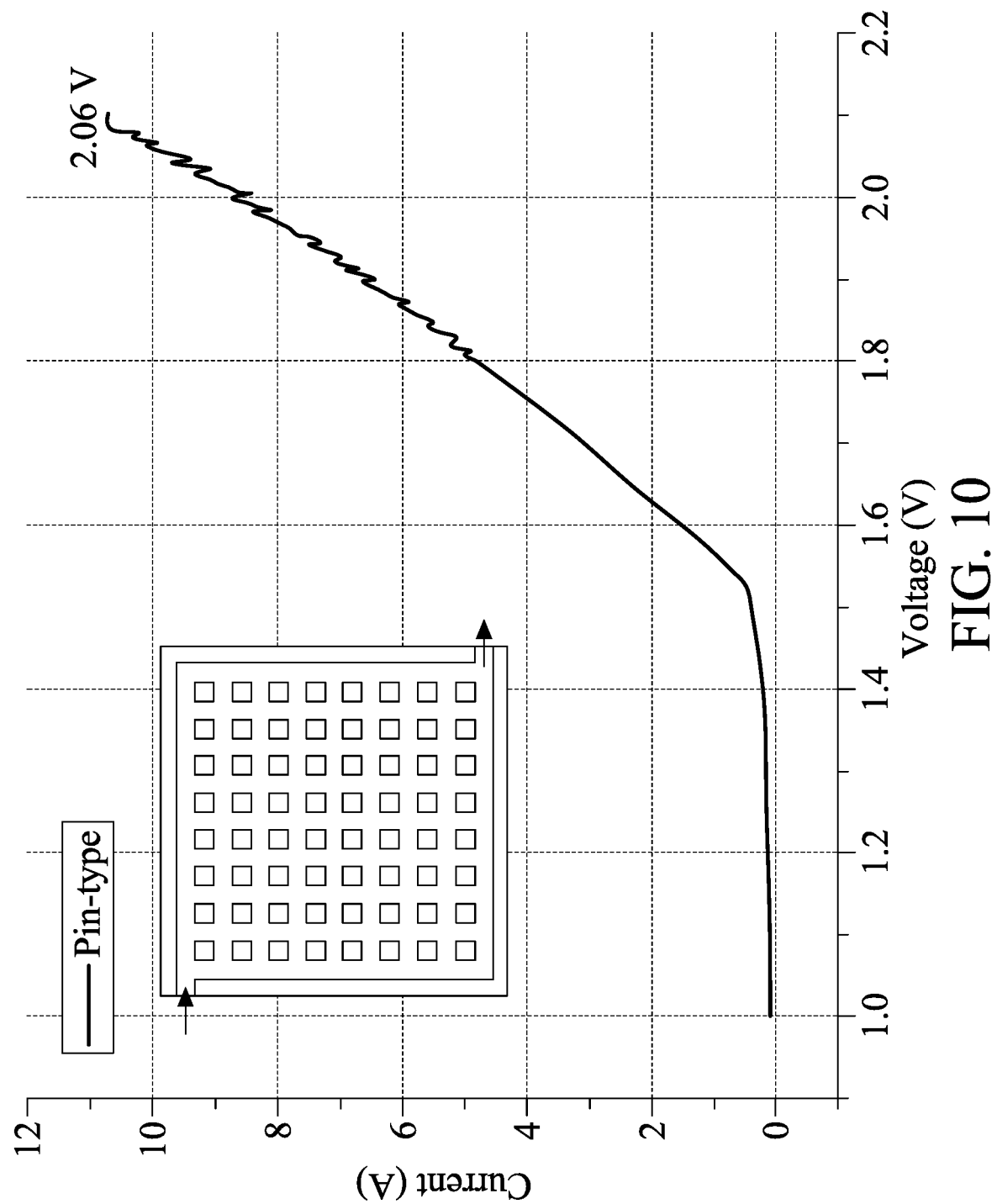
FIG. 10 shows a current versus voltage curve of membrane electrode assemblies in one embodiment.
Figure 11:
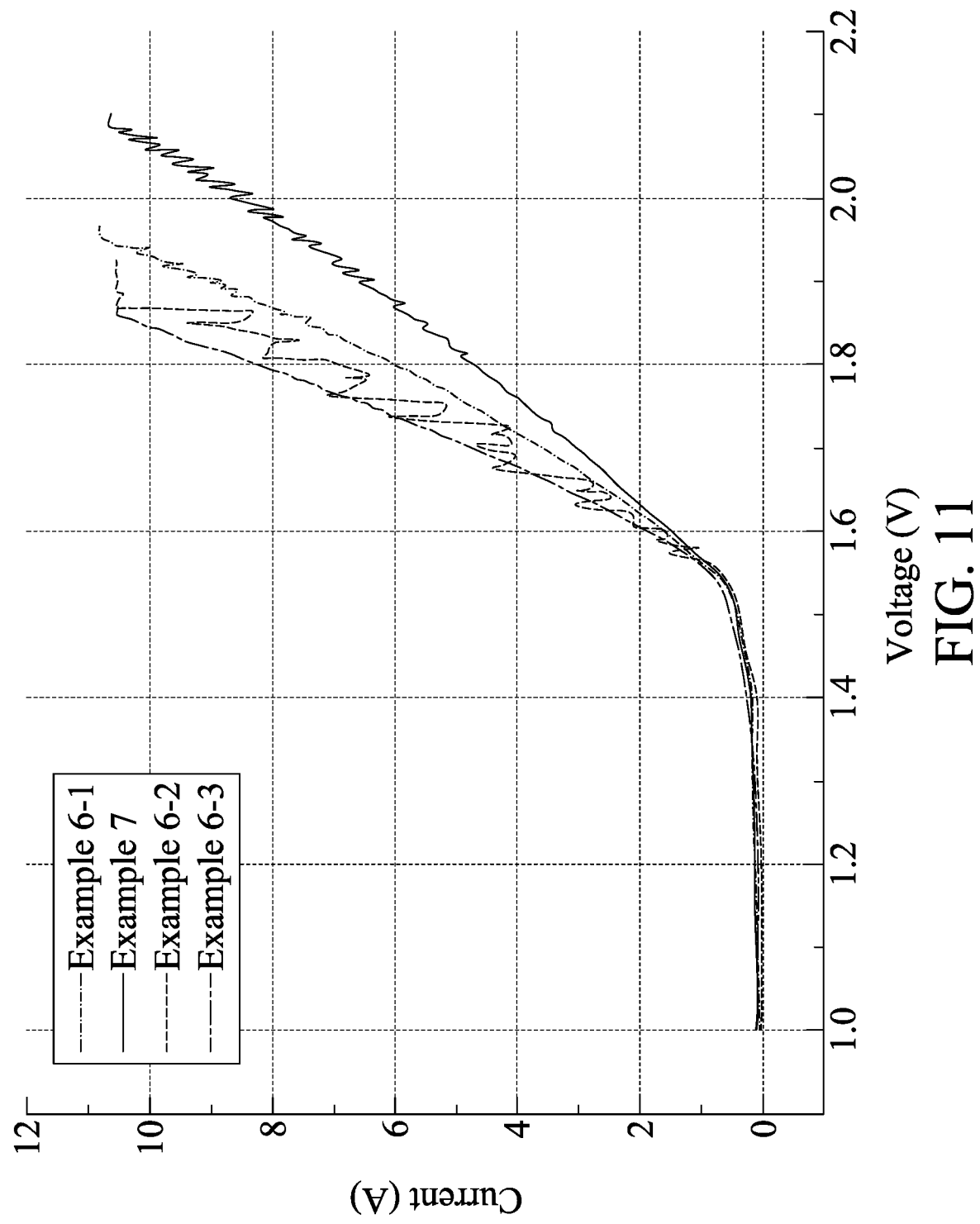
FIG. 11 shows a comparison between current versus voltage curves of the different membrane electrode assemblies.

$Ni_{0.065}Ru_{1.935}$-conductive carbon paper of Preparation Examples 11 and 12 in Taiwan Patent No. 1677596 was selected to serve as a cathode of HER, $Ni_{1.5}Nb_{0.5}N_2$-stainless steel mesh of Preparation Example 9 in Taiwan Patent No. 1677596 was selected to serve as an anode of OER, and a commercially available anion exchange membrane X37-50 (Dioxide Materials) was interposed between the cathode and the anode to form MEA. MEA was interposed between two stainless steel current collectors, a pin-type flow channel layer was interposed between the $Ni_{0.065}Ru_{1.935}$-conductive carbon paper and one current collector, and another pin-type flow channel layer was interposed between the $Ni_{1.5}Nb_{0.5}N_2$-stainless steel mesh and another current collector. MEA was dipped in 2 M KOH solution to test its LSV electrochemical activity as below. The scan voltage ranged from 1.0 V to 2.0 V and the scan rate was 50 mV/s. The current versus voltage curve of MEA is shown in FIG. 10. The comparison between the current versus voltage curves of Example 6-1, Example 6-2, Example 6-3, and Example 7 is shown in FIG. 11. As shown in the comparison, only one electrode (e.g. anode or cathode) adopting the metal-nickel foam could improve the hydrogen evolution efficiency of MEA and omit the flow channel layer on one side of MEA. If both the anode and the cathode adopted metal-nickel foam, the hydrogen evolution efficiency of MEA could be further improved, and the flow channel layers on both sides of MEA could be omitted.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A membrane electrode assembly, comprising:
   a first electrode;
   a second electrode; and
   an anion exchange membrane disposed between the first electrode and the second electrode,
   wherein the first electrode comprises
      a first metal mesh;
      a first catalyst layer wrapping the first metal mesh;
      a second metal mesh; and
      a second catalyst layer wrapping the second metal mesh,
      wherein the first metal mesh is disposed between the anion exchange
   membrane and the second metal mesh,
   wherein the second metal mesh is thicker than the first metal mesh, the first catalyst layer is thicker than the second catalyst layer, the second catalyst layer is iron, cobalt, manganese, zinc, niobium, molybdenum, ruthenium, platinum, gold, or aluminum, and the second catalyst layer is crystalline.

2. The membrane electrode assembly as claimed in claim 1, wherein the first electrode is an anode, the second electrode is a cathode, and the second catalyst layer is iron, cobalt, zinc, niobium, molybdenum, ruthenium, platinum, or gold.

3. The membrane electrode assembly as claimed in claim 2, wherein the first catalyst layer has a chemical structure of $M'_aM''_bN_2$, $M'_cM''_dC_e$, or $M_xRu_yN_2$, wherein M' is Ni, Co, Fe, Mn, Cr, V, Ti, Cu, or Zn, M'' is Nb, Ta, or a combination thereof, M is Ni, Co, Fe, Mn, Cr, V, Ti, Cu, or Zn, $0.7 \le a \le 1.7$, $0.13 \le b \le 1.3$, $a+b=2$, $0.24 \le c \le 1.7$, $0.3 \le d \le 1.76$, $0.38 \le e \le 3.61$, $0<x<1.3$, $0.7<y<2$, and $x+y=2$,
   wherein $M'_aM''_bN_2$ is a cubic crystal system, $M'_cM''_dC_e$ is a cubic crystal system or amorphous, and $M_xRu_yN_2$ is a cubic crystal system or amorphous.

4. The membrane electrode assembly as claimed in claim 1, wherein the first electrode is a cathode, the second electrode is anode, and the second catalyst layer is iron, cobalt, manganese, zinc, niobium, molybdenum, gold, or aluminum.

5. The membrane electrode assembly as claimed in claim 4, wherein the first catalyst layer has a chemical structure of $M_xRu_yN_2$ or $M_xRu_y$, M is Ni, Co, Fe, Mn, Cr, V, Ti, Cu, or Zn, $0<x<1.3$, $0.7<y<2$, $x+y=2$, $M_xRu_yN_2$ is a cubic crystal system or amorphous, and $M_xRu_y$ is a cubic crystal system.

6. The membrane electrode assembly as claimed in claim 1, wherein the first catalyst layer has a thickness of 0.25 micrometers to 1 micrometers, and the second catalyst layer has a thickness of 0.01 micrometers to 0.25 micrometers.

7. The membrane electrode assembly as claimed in claim 1, wherein the second mesh has a pore size of 60 micrometers to 120 micrometers.

8. The membrane electrode assembly as claimed in claim 1, wherein the second metal mesh and the second catalyst layer have a weight ratio of 99:10 to 99.9:0.1.

9. The membrane electrode assembly as claimed in claim 1, being interposed between a first current collector and a second current collector, wherein the first electrode is disposed between the anion exchange membrane and the first current collector, the second electrode is disposed between the anion exchange membrane and the second current collector, and the first electrode and the first current collector have no flow channel layer therebetween.

10. The membrane electrode assembly as claimed in claim 1, wherein the second electrode comprises:
    a third metal mesh;
    a third catalyst layer wrapping the third metal mesh;
    a fourth metal mesh; and
    a fourth catalyst layer wrapping the fourth metal mesh,
    wherein the third metal mesh is disposed between the anion exchange membrane and the fourth metal mesh,
    wherein the fourth metal mesh is thicker than the third metal mesh, the third catalyst layer is thicker than the fourth catalyst layer, the fourth catalyst layer is iron, cobalt, manganese, zinc, niobium, molybdenum, ruthenium, platinum, gold, or aluminum, and the fourth catalyst layer is crystalline.

11. The membrane electrode assembly as claimed in claim 10, being interposed between a first current collector and a second current collector, wherein the first electrode is disposed between the anion exchange membrane and the first current collector, the second electrode is disposed between the anion exchange membrane and the second current collector, the first electrode and the first current collector have no flow channel layer therebetween, and the second electrode and the second current collector have no flow channel layer therebetween.

12. A method for hydrogen evolution by electrolysis, comprising:
dipping a membrane electrode assembly in an alkaline aqueous solution, wherein the membrane electrode assembly comprises:
a first electrode;
a second electrode; and
an anion exchange membrane disposed between the first electrode and the second electrode,
wherein the first electrode comprises
a first metal mesh;
a first catalyst layer wrapping the first metal mesh;
a second metal mesh; and
a second catalyst layer wrapping the second metal mesh,
wherein the first metal mesh is disposed between the anion exchange membrane and the second metal mesh,
wherein the second metal mesh is thicker than the first metal mesh, the first catalyst layer is thicker than the second catalyst layer, the second catalyst layer is iron, cobalt, manganese, zinc, niobium, molybdenum, ruthenium, platinum, gold, or aluminum, and the second catalyst layer is crystalline; and
applying a potential to the first electrode and the second electrode to electrolyze the alkaline aqueous solution for generating hydrogen with the first electrode or the second electrode and generating oxygen with the other of the first electrode or the second electrode.

13. The method for hydrogen evolution by electrolysis as claimed in claim 12, wherein the alkaline aqueous solution has a pH value that is greater than or equal to 13.

* * * * *